3,343,941
ALKYD RESINS WITH HERBICIDAL PROPERTIES

Evan Baltazzi, Brookfield, Ill., assignor to Nalco Chemical Company, Chicago, Ill., a corporation of Delaware
No Drawing. Filed Apr. 24, 1963, Ser. No. 275,528
6 Claims. (Cl. 71—71)

The instant application is a continuation-in-part of my copending application, Ser. No. 64,289 filed Oct. 24, 1960, and now abandoned.

This invention is concerned with new herbicidal compositions and their use in combating undesirable vegetation. More specifically it is concerned with compositions of matter having unusual properties for preventing or inhibiting the growth of various undesirable weeds by improving the effectiveness of known herbicidal compositions.

The use of herbicides to control and inhibit undesirable weed growth is well known and of widespread usage in the agricultural, industrial, and domestic field. Roadsides, embankments, and other earth surfaces are often subjected to treatment with toxic chemicals, organic and inorganic. These numerous compounds with a widespread variance in functionality are effective in inhibiting or destroying the growth of undesirable vegetation.

Obnoxious plants or weeds which interfere with human operations may be broadly classified into two groups. These two groups are known generally as broad leaf plants and grasses. Herbicides have been broadly classified with regard to their activity in combating these pervasive type plants. If the herbicide is effective in destroying or inhibiting the growth of both broad leaf plants and grasses it is considered to be a nonselective type herbicide. Again, those which have only limited activity on certain type plants are known as selective herbicides. However, a nonselective herbicide, while giving good control initially, may have the disadvantage of giving only a short term control. Frequently, massive dosages of herbicidally active chemical are required for a long term kill and such use, therefore, becomes economically impractical.

Many other disadvantages are inherent in all types of herbicides. For example, many are susceptible to direct bacterial decomposition. Other herbicides are leached from the soil by the water and rendered ineffective. Because of solubility problems, some herbicides have the disadvantage of being difficult to apply. In fact, some of these very effective herbicides are insoluble in either hydrocarbon or aqueous type solvents and many are incapable of even being emulsified satisfactorily. Also, toxicity problems are inherent in the use of many well known herbicides. All of these problems make many classes of herbicides either dangerous, or ineffective, or uneconomical to use.

The purpose of this invention then is to remedy all or part of the above inadequacies by providing compositions of matter that are particularly unique in their chemical make-up. The newly invented compositions, because of their chemical make-up, are less subject to the above described limitations than previously known herbicides. In particular, an important feature of the invention is to give both immediate kill and long range destruction or inhibition of growth with only one application of chemical.

Therefore, it becomes an object of the invention to provide new herbicidal compositions which will be effective both immediately, and for long periods of time.

Another object is to provide compositions that will be relatively immune to rapid bacterial decomposition and/or leaching by water.

A further object is to provide herbicidal compositions which will control a wide variety of undesirable vegetation including members of both the two general classes of broad leaf species and grasses.

Still another object of the invention is to furnish herbicidal compositions which can effectively control vegetation growth during one or more growing seasons, even if only one application is made.

A specific object of the invention is to make toxic herbicides relatively safe to apply. Yet another object is to provide well known herbicides in a form which allows a slow release of the active constituents into the area to be controlled.

A very important object of this invention is to furnish herbicidal compositions which are easy to prepare and also economical to use.

Other objects will appear hereinafter.

In accordance with the invention it has been found that herbicidally active alkyd type resins having the properties outlined in the above objects of invention may be readily synthesized. These alkyd type resins are characterized by being immediately water insoluble and may be used either alone, or combined either chemically, or physically with certain types of known herbicides in order to achieve the above objects. The resin products formed in this case all consist of solid compositions which may be applied directly, or which may be applied as a liquid in various formulations.

The embodiments of the invention are many and varied and for simplicity's sake will be listed in the classifications as seen below. After a discussion of the various types of newly invented materials, the novelty and widespread application will then be apparent.

CHEMICALLY MODIFIED HERBICIDAL ALKYD RESINS

It has been found that a water insoluble alkyd resin which has been chemically modified with a phytocidal amount of an organic halogenated monobasic acid may be applied directly to the soil surface and thereby maintain a slow but effective control of the undesirable vegetation in that area. These herbicidal resins are water insoluble and are not readily removed from the soil surface by rains. They remain substantially intact for prolonged periods of time. Nevertheless, the active portion of the resinous herbicidal composition is still released at a rate consistent with good control of plant growth.

The slow, controlled release of herbicides from the resins supplies uniform amounts of herbicidal material for long periods of time. This means that a single application will be sufficient to give complete weed control for one or more seasons. This slow release action has a profound effect on annual plants and grasses, particularly those which continue to germinate throughout an entire growing season. Such plants are most affected by the action of soil sterilants and hormone types of herbicides during their early growth periods. Since most annuals are shallow rooted, they are most susceptible to herbicides located in the top soil areas. Early spring applications of conventional herbicides are ineffective on late germinating annuals since they leach out of the top soil into lower soil layers where they do not contact shallow roots. Thus, much of their effectiveness is lost.

The water insoluble alkyd resins used in preparing the compositions of the invention may be chosen from a wide class of materials. An alkyd resin may be defined as the resinous product of reaction involving polyfunctional alcohols and polybasic acids. By the term "polyfunctional alcohol" is meant a molecule having at least one hydroxyl group and at least one additional chemical group capable of chemical reaction with a carboxylic acid radical. Preferred polyfunctional alcohols are those compounds having at least three functional groups. Also, more than one polyfunctional alcohol or polybasic acid may be used in synthesizing the same alkyd resin, to obtain special properties. The wide variety of resinous products obtained by the use of an alkyd resin, is an important facet of the invention.

All the resinous products of the invention are considered immediately water insoluble. The term "immediately water insoluble" is here used to designate materials that will dissolve initially in water to the extent of no more than 0.001% by weight. Long term exposure to hydrolytic conditions will cause substantially more dissolution.

While the classical definition of an alkyd resin may include such resins as styrenated alkyds, epon resins, and urethane resins, the only compositions that will be chemically or physically modified with herbicidal acids are basically alkyd resins as heretofore defined. These resins may either be linear type or cross linked alkyd resins, depending upon the functionality of the starting materials. Also, they may be modified prior or subsequent to the herbicidal modification as later explained more fully but the herbicidal modification itself must take place on the resin molecule through free functional groups such as hydroxyl groups contained thereon. Greatly preferred alkyd resins are polyesters formed by reaction of a polyfunctional alcohol containing at least two hydroxyl groups with a polycarboxylic acid.

Since the herbicidal compositions of the invention are immediately water insoluble and the toxic material contained therein is only very slowly released, these compositions are relatively non-hazardous to humans. Consequently, by use of these new materials, many previously troublesome toxic problems are obviated. While the primary reactants involved in the formation of an alkyd resin are a polyfunctional and preferably a polyhydric alcohol and a polycarboxylic acid, it is well known in the alkyd resin technology that these alkyd resins may be modified by reaction with a monobasic acid. Many particularly desirable characteristics of the alkyd resin may be obtained by the expeditious reaction with varying amounts of monobasic acids. These acids are usually fatty, unsaturated long chain acids, and are the major components of the common vegetable drying and semi-drying oils such as linseed, soya, cotton seed, peanut, and olive oil. It has been found that alkyd resins may also be modified by the use of an organic halogenated monobasic herbicidal acid which may be said to be a substitute for the drying and non-drying oils enumerated above. These herbicidal acids chemically react with the polymeric resin such as through free hydroxyl groups on the alkyd resin in the same manner as do the fatty acids. The alkyd resins, therefore, have been chemically modified by a true chemical reaction such as esterification by the herbicidal acid.

The chemically modified herbicidal resin is then applied to the situs which is to be controlled and the herbicidally active portion of the resin is slowly released to act as toxicant upon the undesirable vegetation. The mechanisms in which the active portion of the resins are released are thought to be of two types. The first type is merely the well known hydrolytic reaction. Moisture, coupled with acidity or alkalinity in the soil (and/or microbiocidal action) brings about the hydrolysis of the herbicidal portion of the alkyl resin. While it is true that such release depends upon the varying conditions of pH and moisture content, it will be seen later that the herbicidal release is normally uniform.

It is well known in the herbicidal art that there is a reciprocal relationship between the activity of various weed and brush control chemicals and soil microorganisms. The compositions of this invention take advantage of the bacterial decomposition of herbicides by allowing certain soil bacteria to act upon the resins and thereby release the active portion into the soil to be treated. Studies have shown that certain herbicidal esters are de-esterified by specific soil bacteria. In the present case when the herbicidally active resins of the invention are prepared from polyhydric alcohols to form polyester units, they are subsequently de-esterified by such soil bacteria as the soil diptheroids (Coryne bacteriaceae) and the soil pseudomonads (Pseudomonas species). The herbicidal portion of the resin is then freed to act upon the undesired vegetation. It is thought that killing activity is retained during the length of time before a complete decomposition of the organic resin compound takes place.

A very important aspect from the point of view of control of phyiscal properties of final product in alkyd resin synthesis is the proportion of the fatty acid modifier to the polybasic acid. This proportion may be expressed in a number of ways. Most useful is the alkyd resin ratio. This alkyd ratio refers to the weight percent of product such as ester which could be obtained if the polycarboxylic acid in the resin formulation had been reacted with the stoichiometric equivalent amount of polyfunctional alcohol. This alkyl ratio or alkyd number as it is sometimes known, is thus a function of the oil which has been added to modify the alkyd resin. In other words, a particular polyfunctional unit in a resin molecule may have one or more of its functional groups, such as its hydroxy groups, reacted with polybasic carboxylic acid and one or more others of its functional groups chemically modified by reaction with a monobasic fatty oil. The alkyd number is a direct reflection of the amount of fatty oil that has been incorporated into the resin. If the alkyd number is 100 we have no chemical modifications of the polyester resin. Again, if the alkyd ratio is zero we have a pure oil. It has been found that the use of this alkyd number has made the invention easier to define. The fatty acid oils normally employed in the alkyd resin synthesis have, in making the materials of this invention been totally or partly replaced by the monobasic herbicidal acids, In describing the newly invented resins, the alkyd number is used to define the amount of the herbicidal monobasic herbicidal acid that has been chemically incorporated into the alkyd resin.

In order to obtain good herbicidal activity and control of undesirable vegetation the alkyd number of the compositions of this invention must be less than 75. In order to obtain a high herbicidal activity the alkyd number is desirably from 10 to 70 and more preferably from 30 to 50. A complete discussion of alkyd numbers or ratios may be found in Von Fischer Paint & Varnish Technology, Reinhold Publishing Corporation, 1948, pages 119–144. This discussion is here incorporated by reference.

The polyester resins may be formed from a wide variety of polycarboxylic acids and polyfunctional alcohols. It has been found, that the most preferred resinous composition for the purpose of the invention is one in which the polyfunctional alcohol contains at least three functional groups. This enables a certain amount of cross linking to take place and results in a hard friable composition which is easily ground for ready application to the soil or incorporation into liquid formulations. More importantly it allows free functional groups to be available for subsequent reaction with herbicidal acids. Of these, the most preferred are polyhydric alcohols containing at least three hydroxyl groups.

Many carboxylic acids are useful, among which are phthalic, carbic, succinic, adipic, azelaic, sebacic, maleic, fumaric, citric, aconitic, tricarballylic, isophthalic terephthalic, halophthalic, endomethylenetetrahydro phathalic, 3,6-endoxohexahydrophthalic and humic acids. The particularly preferred acids which were employed in the invention are phthalic and humic.

Instead of using these acids, any of their corresponding anhydrides may also be used. It is well known that in an esterification reaction it is the acyl group that undergoes the direct combination. Anhydrides may be just as readily employed to supply the acyl group and are for the purposes of the invention considered analogous to the acids. Thus, for example, phthalic acid or phthalic anhydride may be combined with a polyfunctional alcohol with the only preference of use being dependent upon the economics involved.

Another polycarboxylic acid that is particularly suited because of its low cost is humic acid. The term "humic acid" is applied to a wide range of related materials obtainable from natural sources (peats, brown coals and lignites) as well as to those which can be prepared by suitable treatment of polyhydric phenols and carbohydrates. Only little is presently known about the chemical structure of humic acids. It is considered, however, that lignin is the source from which the humic acids are derived, so that they may be regarded as intermediate products in the conversion of lignin to hard coal and anthracite.

Humic acids are characterized particularly by their solubility in cold alkali solution. They also give typical salts upon reaction with strong bases. Probably the most important characterization of these humic acids is the fact that there are four to five carboxyl (COOH) groups per mole of humic acid. A tentative formula has been proposed as follows:

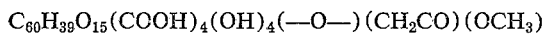

$C_{60}H_{39}O_{15}(COOH)_4(OH)_4(-O-)(CH_2CO)(OCH_3)$

The following structure for humic acid has been postulated as one that seems to be very close to the composite of the true product.

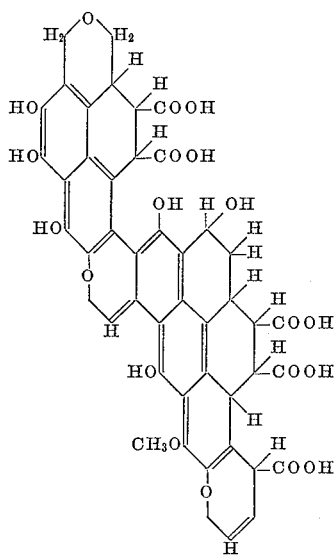

A complete summary of humus chemistry has been made by Selman A. Wakesman, The Williams & Wilkins Company, 1938.

While humic acids have found a wide variety of uses, their use as a reactant in a alkyd resin herbicidal composition is considered particularly novel.

The alkyd resins prepared from humic acid are also considered unique and may be formed by the same type of condensation polymerization reactions as other common polycarboxylic acids undergo with polyfunctional alcohols. Since the amount of available carboxylic acid moieties available per mole of humic acid is quite high, namely four or five, and since the cost per mole is also quite small, a resin produced through the expeditious use of such material is particularly desirable in making up the compositions of the invention.

Many polyfunctional alcohols have shown usefulness as reactants in the formation of the herbicidal alkyd resins of this invention. The more preferred materials are ethylene glycol, trimethylol propane, diethylene glycol, triethylene glycol, pentaerytritol, propylene glycol, dipentaerythritol, sorbitol, glycerol, mannitol, monoalkanol amines, dialkanol amines, and trialkanol amines. Examples of particularly desirable hydroxyl amines are monoethanolamine, diethanolamine, and triethanolamine. From the standpoint of economics, reactivity and desirability of end product, glycerol is the most preferred material.

Uniquely desirable alkyd resins can be prepared by reacting humic acid with the above polyfunctional alcohols. All the resins of this class are hard, friable compounds capable of being granulated to any desired mesh size. Also, these compounds are stable at elevated temperatures. This allows them to be subsequently modified in further chemical reactions.

In order to prepare these humic alkyds, the mole ratio of humic acid to polyfunctional alcohol may be varied from 8:1 to 1:8 with the preferred mole ratio range being from 4:1 to 1:4.

The preparation of humic and resins may be effected by well known condensation polymerization methods. However, the most convenient method is as follows.

The humic acid and polyfunctional alcohol are thoroughly admixed in a non-polar aromatic solvent capable of forming an azeotrope with water. The entire mixture is then heated at the reflux temperature of the azeotrope and the resultant water produced in the reaction is continuously removed from a trap which has been provided for this purpose. The total heating time may range from ½ to 20 hours in length depending upon the ratio of humic acid to polyfunctional alcohol.

The reaction time more usually varies from 1 to 7 hours. The temperature of the reaction is directly dependent upon the organic solvent employed but it has been found that the most preferential reaction temperatures range from 80° C. to 180° C.

After the reaction is complete, as determined by a measurement of the water of the azeotrope, the solvent is stripped off in a reduced vacuum oven or at room temperature under atmospheric conditions. The resultant product may be ground and used as such. The ground material may also be used in further chemical reactions or in making liquid formulations through physical modification by non-chemical means.

The alkyd resin made by reacting glycerol and phthalic anhydride is one which possesses the necessary properties of solubility for a later incorporation into other substances such as aromatic oils. It is also a resin with the requisite amount of cross linking to give a hard granular mass which can be broken up into fine granules. The relative low cost of both phthalic anhydride and glycerol make them extremely attractive as reactants in synthesizing alkyd resins useful in the invention.

The organic halogenated monobasic herbicidal acids that have been particularly useful in a chemical modification of the above alkyd resins are 2,4-dichlorophenoxyacetic, trichloroacetic, 2,3,6-trichlorobenzoic, 2,4,5-trichlorophenoxyacetic, 2,2-dichloropropionic, 2 - (2,4 - dichlorophenoxy)-propionic and 2-methyl-4-chlorophenoxyacetic. The most preferred halogenated acid of this group is 2,4-dichlorophenoxyacetic which also is well known as 2,4-D herbicide acid.

There is a wide variety of ways in which the herbicide acid may be incorporated into the alkyd resin but probably the easiest and most efficient method is a direct incorporation during the condensation polymerization step itself. The three constituents, polycarboxylic acid, polyfunctional alcohol, and monobasic halogenated herbicidal acid may be added in any sequence whatsoever into a reaction vessel and then thoroughly mixed.

The amount of herbicidal activity is then directly dependent upon the amount of active herbicidal acid that is added to the composition. The amount of cross linking is inversely proportional to the amount of additive herbicidal acid. It is desirable to adjust additive proportions to allow a certain amount of cross linking to take place to get the desired hard resinous product. The total heating time for the reactants may vary from 1 to 12 hours in length. The reaction temperature may also be widely varied from 100 to 250° C., depending upon the nature of the reactants and their liquid consistencies in the reaction mixture itself.

It is desirable to maintain the reaction temperature above the melting point of the mixture in order to effect good mixing during the polymerization reaction. This enables the herbicidal composition not only to be uniform but to react to the desired extent.

One desirable facet of the invention is the use of chemicals forming azeotropes with water such as xylene, benzene, toluene, or other aromatic hydrocarbons in order to drive the reaction to completion. The azeotrope, of course, removes from the reaction mixture, the water which has been formed during the condensation polymerization step.

After the requisite heating has taken place it is usually desirable to pour the product from the reaction flask while still in a liquid form. When the resin has solidified it is advantageous to grind or granulate the solid into the desired mesh size. These mesh sizes may vary from 4 to 200.

Although as has been described above, the amount of herbicide used has been distinguished by recitation of an alkyd number, another common way of defining the inventive composition is in terms of mole ratios. It has been found that the mole ratio of polyfunctional alcohol to polycarboxylic acid may be varied from 1 to 5 to 5 to 1. In like manner the molar proportion of monobasic acid to polycarboxylic acid may be varied from 1 to 5 to 10 to 1, and the molar proportion of monobasic acid to glycerol may be varied from 1 to 5 to 5 to 1.

To demonstrate several typical products within the scope of the invention the following examples are presented. It is to be understood, however, that the examples are for the purpose of illustration and the invention is not to be regarded as limited to any of the specific conditions are reactants set forth therein.

*Example I*

The following example illustrates a bulk type polymerization incorporating the known herbicide, 2,4-dichlorophenoxy acetic acid directly into an alkyd resin during the condensation polymerization step. The 2,4-D herbicide is thus chemically combined with the alkyd resin through ester linkages.

Into a three-neck 1-liter resin flask are introduced the reactants. The flask is equipped with a cone-driven stirrer and a thermometer. 131 grams of glycerol, 174.5 grams of phthalic anhydride and 250 grams of 2,4-D are added together in that sequence with moderate stirring. The flask is heated rapidly to 100° C. and then the temperature is slowly raised to 225° C. during the next 80 minutes. Condensate water escape during the reaction. The liquid mass is poured into a suitable container and subsequently ground when it has cooled to a hard, friable solid mass. The solid may be ground to any desired mesh size from 4 to 200.

*Example II*

As in Example I a bulk type condensation polymerization was run. Into a three-neck 3 liter resin flask were introduced 500 grams trichloroacetic acid, 358 grams of glycerol and 478 grams of phthalic anhydride in that order. After the reactants were thoroughly mixed the flask was quickly heated to 100° C. During the course of the next 60 minutes the temperature was raised to 194° C. while stirring was continued. Steam condensate was allowed to escape from the reaction vessel. The product was again cooled and ground.

*Example III*

This reaction was run similar to the one described in Example I with the exception that the reaction mixture was heated slowly from 100° C. to 200° C. for 2½ hours.

*Example IV*

In order to obtain a larger excess of hydroxyls in the resin, 150 grams of glycerol was substituted for the 131 grams of glycerol employed in Example I. The reaction conditions were then identical to those of Example III.

*Example V*

150 grams of glycerol, 174.5 grams phthalic anhydride, and 250 grams of 2,4-D were thoroughly mixed in a 1 liter, 3 neck resin flask and then heated while stirring to 100° C. The mixture was then slowly reacted by raising the temperature from 100° C. to 212° C. over the course of 13 hours. The steam produced by the reaction was allowed to escape.

*Example VI*

16.9 grams of trichloroacetic acid, 29.4 grams glycerol and 53.8 grams of phthalic anhydride were added together with stirring to a 500 cc. neck resin flask. The mixture was heated with continuous agitation at 150° C. for 3½ hours.

In order to drive the reaction to completion the flask was cooled to 80° C. The water condensate resulting from the esterification reaction was then effectively and completely removed by the following use of an azeotropic mixture. 86.1 grams or 100 cc. xylene were added to the flask after it was fitted with a Friedrich condenser connected above a Dean and Stark trap. Heat was again applied for a period of 3 hours. The temperature of the resin flask remained slightly above the temperature of the xylene-water azeotrope.

The majority of the xylene solvent was stripped off under aspirator vacuum and the semi-solid reaction flask residue was dried to hardness in a vacuum oven by heating at 60° C. for 72 hours.

*Example VII*

125 grams 2,4-D, 250 grams of trichloroacetic acid, 244 grams of glycerol, 320 grams of phthalic anhydride, and 250 cc. of xylene were mixed together in a 3 liter, 3 neck resin flask, and fitted with a cone driven stirrer, condenser placed above a Dean and Stark trap and a thermometer. The contents of the flask were intimately mixed for ½ hour. The reaction mixture was then heated for 20 hours at the reflux temperature of the azeotrope. Water was withdrawn from the Dean and Stark trap when it became necessary to do so. After the requisite time had elapsed the xylene was removed by a vacuum type distillation at elevated temperatures. A total of 70 cc. of $H_2O$ which had separated out from the azeotrope was collected.

*Example VIII*

68 grams 2,4-D, 500 grams trichloroacetic acid, 248 grams glycerol, 355 grams phthalic anhydride and 260 grams xylene were thoroughly mixed in a 3 neck, 3 liter resin flask equipped with a stirrer, a thermometer and a Friedrich condenser connected above a Dean and Stark trap. After 7 hours of reflux during which time approximately 90 cc. of $H_2O$ were removed, the reaction was considered essentially complete. The excess solvent was stripped off under aspirator vacuum and the resulting residual hard, friable mass was then granulated after allowing it to dry under atmospheric conditions for one week. The loss in weight was only 2.8% calculated on a theoretical product basis assuming that all the available acid was esterified.

*Example IX*

This example illustrates the utility and practicability of the invention by the use of a very economical source of carboxylic acid groups, namely through the use of humic acid which contains on the average of four to five carboxylic acid groups per molecule. 250 grams of 2,4-D, 88 grams of phthalic anhydride, 88 grams of humic acid and 150 grams of glycerol were rapidly heated to 175° C. while stirring was effected. The temperature was then raised to 200° C. over a period of 3 hours, after which time the contents of the flask were quickly poured into an aluminum pan before the liquid mass solidified. The solid was then ground into the requisite form.

*Example X*

This example was run similar to Example IX with the exception that the phthalic anhydride was replaced with an equal amount of humic acid, 176 grams total humic acid being employed. This reaction mixture was heated to form 100° to 200° C. for a period of 5 hours, and the resultant solid was ground.

*Example XI*

250 grams of 2,4-D, 88 grams phthalic anhydride, 88 grams of humic acid and 150 grams of diethanolamine were added with mixing to a 1 liter, 3 neck resin flask. The temperature was quickly raised to 100° C., and then heat was slowly applied over a period of five hours, the maximum temperature reaching 200° C. The solid was then granulated prior to use.

herbicidal acid introduced into the resinous composition. Good growth control of undesirable vegetation has been accomplished through the use of herbicidal acid in amounts from 2 to 600 pounds per acre. However, the more preferred amounts of herbicidal acid range from 8 to 200 pounds per acre. The amounts of corresponding herbicidally active alkyd resin employed are from 2 to 2000 pounds per acre and more preferentially from 12 to 1200 pounds per acre.

In order to determine the type of control that is effected through the use of the compositions of the invention, several representative samples were ground and applied directly to both broad leaf and grass type vegetation. The compositions of the invention were then directly compared to an exact amount of pure monobasic halogenated herbicidal acid corresponding to the type contained in the compositions themselves. An exact equivalent amount of pure acid was applied corresponding to the calculated amount of herbicidal acid present in the resinous compositions.

Table I recites the percent kill affected through the use of representative resin compositions of the invention, compared with the percent kill accomplished by using the same type of pure monobasic halongenated herbicidal acid as was used in synthesizing the resin.

TABLE I

| Composition | Pounds/Acre | Percent Broad Leaf Kill | | | Percent Grass Kill | | |
|---|---|---|---|---|---|---|---|
| | | 25 days | 43 days | 78 days | 25 days | 43 days | 78 days |
| Example I | 64 | 90 | 90 | 98 | 80 | 70 | |
| Do | 32 | 90 | 80 | 90 | 80 | 60 | |
| Do | 16 | 90 | 80 | | 70 | 60 | 30 |
| Do | 88 | 90 | 70 | | 80 | 50 | 30 |
| 2,4-dichlorophenoxy acetic acid | 64 | 100 | 98 | 98 | 95 | 85 | |
| Do | 32 | 100 | 95 | 90 | 80 | 60 | |
| Do | 16 | 100 | 90 | | 80 | 60 | 40 |
| Do | 8 | 95 | 90 | | 90 | 50 | 30 |
| Example IV | 64 | 90 | 80 | 95 | | | |
| Do | 32 | 90 | 80 | 90 | | | |
| Do | 16 | 80 | 70 | 90 | | | |
| Do | 8 | 80 | 50 | 85 | | | |
| Example IX | 64 | 100 | 98 | 98 | 100 | 60 | 70 |
| Do | 32 | 100 | 95 | 80 | 100 | 70 | 70 |

*Example XIII*

This example illustrates the method of providing a new and novel polyester.

200 grams of humic acid, 150 grams of glycerol, and 200 cc. xylene were added sequentially with continuous stirring to a 3 neck, 1 liter resin flask equipped with a cone-driven stirrer, thermometer, and a Friederick condenser connected over a Dean and Stark apparatus. The mixture was refluxed for 7 hours with the water being removed from the azeotrope when necessary. The excess xylene solvent was distilled off under 10 mm. vacuum and the resultant solid was ground to a mesh size of 10–50.

*Example XIII*

This example was run similarly to Example XII with the exception that an equal amount of diethanol amine was substituted for the glycol.

The compositions of the examples described above are useful under a wide variety of conditions and may be used for numerous weed control problems. Since all of these compositions contain combined therein potential sources of monobasic halongenated herbicidal acids they give long term kills on perennials and continuing kills to germinating annuals through a slow release mechanism of the type described above.

The amount of resin that is necessary to give good control is of course directly dependent upon the amount of The activity of Example I and Example IV compositions which both contain 2,4-D herbicidal acid were directly compared to the pure 2,4-D herbicidal acid itself. It can be readily seen that essentially the same type of control has been given both by the resinous compositions of the invention and a pure herbicidal acid therein. 2,4-D acid, of course, is particularly effective against broad leaf type of vegetation and it is significant that the composition of Example IV exhibits even better or as good control as does the pure acid itself after a period of 78 days. Of course such control could only be effected if the slow release mechanism of de-esterification or bacterial decomposition was continually working as has been suggested. In other words, the resins themselves or the decomposition products thereof are giving a slow release of herbicidal ingredients into the soil to be controlled.

Table II below illustrates the utility of the invention by directly comparing the compositions of Example VII and VIII which contain two types of herbicidal acids, namely, 2,4-dichlorophenoxyacetic acid and trichloroacetic acid against the pure acids themselves. Under the column, "pounds per acre," the first figure refers to an amount of 2,4-dichlorophenoxyacetic acid which is being applied and the second figure refers to the amount of trichloroacetic acid that is being applied. As in Table I, these figures refer to the amount of active ingredients in both Examples VII and VIII in order to give a direct comparison against the same combination of pure acids employed.

TABLE II

| Composition | Pounds/Acre | Percent Broad Leaf Kill | | | Percent Grass Kill | | |
|---|---|---|---|---|---|---|---|
| | | 25 days | 43 days | 78 days | 25 days | 43 days | 78 days |
| Example VII | 64/128 | 100 | 98 | 98 | 100 | 100 | 98 |
| Do | 32/64 | 90 | 80 | 70 | 100 | 80 | ------ |
| Do | 16/32 | 95 | 80 | 70 | 90 | 60 | ------ |
| Do | 8/16 | 80 | ------ | 60 | 70 | 60 | 85 |
| 2,4 dichlorophenoxyacetic acid/ trichloroacetic acid | 64/128 | 90 | 100 | 98 | 100 | 100 | 98 |
| Do | 32/64 | 95 | 98 | 75 | 100 | 98 | ------ |
| Do | 16/32 | 95 | 95 | 75 | 100 | 100 | ------ |
| Do | 8/16 | 95 | ------ | 80 | 90 | 95 | 95 |
| Example VIII | 64/470 | 100 | 99 | 100 | 100 | 100 | 100 |
| Do | 32/235 | 80 | 95 | 100 | 100 | 100 | 100 |
| Do | 16/117 | 100 | 98 | 95 | 100 | 98 | 100 |
| Do | 8/59 | 100 | 95 | 85 | 100 | 95 | 95 |
| 2,4 dichlorophenoxyacetic acid/ trichloroacetic acid | 64/470 | 100 | 100 | 100 | 100 | 100 | 100 |
| Do | 32/235 | 80 | 95 | 100 | 100 | 100 | 100 |
| Do | 16/117 | 100 | 98 | 90 | 100 | 100 | 100 |
| Do | 8/59 | 100 | 98 | 95 | 100 | 98 | 100 |

The results in Table II demonstrate that the same type of control may be affected through the use of the resinous compositions as that control given by the pure halogenated acids themselves.

Table No. III below, illustrates a similar result as that given in the two preceding tables.

TABLE III

| Composition | Pounds/Acre | Percent Broad Leaf Kill | | | Percent Grass Kill | | |
|---|---|---|---|---|---|---|---|
| | | 25 days | 43 days | 78 days | 25 days | 43 days | 78 days |
| Example VI | 60 | 100 | 0 | 0 | 70 | 60 | 70 |
| Trichloroacitic acid | 60 | 100 | 0 | 0 | 100 | 90 | 90 | effective on the different types of annuals and perennials but they also give both rapid and long term growth control. It is believed that the physically admixed herbicide is more rapidly released from the resinous composition than the chemically bonded organic halogenated monobasic herbicidal acid contained therein. Consequently a relatively rapid initial control is given by the physically bonded composition. Later an extended time slow release mechanism takes over the inhibition of growth. Such a composition is of course extremely desirable where the site is to be controlled has many different undesirable kinds of varieties of plants.

The following examples illustrate the physical incorporation of several varying types of herbicides into a water insoluble alkyd resin which has been previously chemically modified with an organic halogenated monobasic herbicidal acid.

UNIFORM INCORPORATION OF OTHER KNOWN HERBICIDES IN HERBICIDALLY ACTIVE ALKYD RESINS

Only acid type herbicides may be chemically incorporated into the alkyd resin which at first sight appears to somewhat limit the scope of the invention. However, it has been found that this illusory drawback is readily overcome by uniformly and physically distributing other and varied types of known herbicides in the water insoluble alkyd resin which has been previously chemically modified with an organic halogenated monobasic herbicidal acid. The desired type of slow release may be so effected with the added advantage of increased versatility and consequent closer control of undesirable vegetation. This is easily accomplished by heating the solid herbicidally active polyester resins to their liquification point and then thoroughly admixing at said temperature, other various desired herbicides until a uniform distribution of said added herbicides is obtained. The additive herbicides that may be physically admixed may be selected from the group consisting of halogen substituted phenols, nitro substituted phenols, organic monobasic halogenated carboxylic acids and esters thereof, s-triazines, phenyl mercuric acetate, potassium cyanate, substituted ureas, arsenic containing compounds, ammonium sulfamate, boron containing compounds, maleic hydrazide, chlorate compounds, alkali metal thio-cyanates, isopropyl phenyl carbamate and its halo derivatives. Not only do these compositions have the advantage of being

Example XIV

Composition: Parts by weight
Composition of Example V _____ 25
3-para-chlorophenyl 1,1 dimethyl urea _____ 25
Talc _____ 50

The solid composition of Example V was heated to 190° C. for five minutes in order to form a viscous pourable liquid. The solid 3-para chlorophenyl 1,1 dimethyl urea was then slowly poured into the above liquid with vigorous agitation for one-half hour. After this was completed talc was admixed in the still liquid composition to provide bulk and allow for more complete coverage when the composition is applied to the undesirable vegetation.

Example XV

Composition: Parts by weight
Composition of Example I _____ 80
2-chloro-4-ethylamino-6-isopropylamino-s-triazine _____ 20

As in Example XIV, the resinous composition was heated until a melt was obtained. The s-triazine was then added until the blend was completely homogeneous. After the liquid had cooled to a solid the composition was then ground into the desired mesh size of from 4 to 200.

*Example XVI*

Composition: Parts by weight
- Composition of Example X _____ 70
- Ammonium sulfamate _____ 30

The humic acid polyester which had heretofore been incorporated with 2,4-D herbicidal acid was heated to 150° C. The ammonium sulfamate was then very slowly added to the liquid over a period of 15 minutes.

This particular composition not only has a hormone-like kill of weeds but also has a contact action due to the ammonium sulfamate and is particularly suited to inhibiting the growth of certain perennial species, particularly shrubby types. As in the other resinous compositions of the invention, the breakdown of 2,4-D due to microorganisms or other types of decomposition which is particularly rapid in warm moist soils is substantially inhibited.

PHYSICAL ADMIXTURE OF HERBICIDES AND HERBICIDALLY ACTIVE ALKYD RESINS

Another modification of the invention may include a physical admixing of known herbicides with the previously discussed resinous composition without resort to melting the resins. These known herbicides may be formulated with the resinous compositions in a wide variety of ways. They may be dissolved in phytotoxic type aromatic oils or water slurries of these compositions may be made. Another permutation may be a water-oil emulsion of the resinous compositions of the invention. A liquid formulation may be particularly desirable if resort must be had to spraying methods. The following examples are illustrative of the incorporation of known herbicides into the resinous compositions by mixing without liquifying the resins themselves. This is particularly desirable where the resins may have a tendency to decompose upon further heating.

A typical aromatic type oil, Oil A, was employed in the following examples. An analysis of the oil gave the following properties:

| | |
|---|---|
| Specific gravity, percent | 0.92 |
| Aromatic content, percent | 85–90 |
| Color ASTM | (1) |
| Mixed aniline point, ° F. | 78 |
| Distillation range, mm. | 760 |
| I.B.P., ° F. | 340 |
| 10% recovered, ° F. | 363 |
| 50% recovered, ° F. | 446 |
| 90% recovered, ° F. | 500 |
| End point, ° F. | 432 |
| Pentachlorophenol solution at 40° F., percent | 15.0 |

¹ Pale amber.

*Example XVII*

Composition: Parts by weight
- Composition Example IX _____ 9
- Maleic hydrazide _____ 25
- Water _____ 25
- Oil A _____ 40
- Toximul–250 _____ 1

This example illustrates further the scope of the invention by the formulation of the resinous herbicide with maleic hydrazide in a water-oil emulsion type composition. Toximul 250 is a non-ionic detergent or emulsifier which consists of an amine salt of dodecyl benzene petroleum sulfonate and nonyl phenolethylene oxide adduct thereof.

*Example XVIII*

Composition: Parts by weight
- Composition of Example I _____ 80
- Propylene glycol butyl ester of 2,4-dichlorophenoxy acetic acid _____ 20

The resin composition of Example I is directly dissolved in a herbicidally active ester to produce an extremely versatile liquid composition suitable for application by spraying.

*Example XIX*

Composition: Parts by weight
- Composition of Example I _____ 12
- Composition of Example II _____ 25
- Pentachlorophenol _____ 17
- Ammonium sulfamate _____ 18
- Water _____ 10
- Oil A _____ 18

Oil-water emulsion compositions may be made employing more than just one herbicidal resin compound. This example illustrates the further versatility of the invention by a composition incorporating three distinctly different active herbicides. These are all combined in a liquid emulsion for easy application.

*Example XX*

Composition: Parts by weight
- Composition of Example VII _____ 45
- Sodium tetraborate _____ 55

The composition of Example VII was intimately ground immediately after the resin had been combined with sodium tetraborate. Boron compounds are particularly known as desirable soil sterilants. The combination of such a soil sterilant with the well known herbicidal acids 2,4-D and trichloroacetic acid which had heretofore been incorporated into the resin of Example VII gives another very versatile herbicidal composition.

*Example XXI*

Composition: Parts by weight
- Composition of Example V _____ 40
- Trichloroacetic acid _____ 30
- Oil A _____ 30

This liquid dispersion was also found to be a useful herbicidal composition.

*Example XXII*

Composition: Parts by weight
- Composition of Example X _____ 22
- Sodium chlorate _____ 7
- Sodium tetraborate _____ 15
- Water _____ 18
- Oil A _____ 37
- Toximul–250 _____ 1

This is another oil in water emulsion similar to that of Example XIX.

In all compositions involving the incorporation of known herbicides into the resinous herbicidal alkyd resins it is important that the herbicides be uniformly dispersed in the resin matrix whether they are so dispersed by the liquid melt technique, or whether merely admixed in a solid or liquid media. When heat is applied care should be exercised so as to avoid a thermal decomposition of the herbicidal chemicals.

The dosages required for weed control with compositions of the invention will depend upon the circumstances of each individual situation. One skilled in the art may, by using conventional weed control techniques, quickly ascertain the amount that is necessary to be applied in effective dosages. A proper selection of the specific herbicides, whether they be chemically bonded to the resin or merely physically admixed therein, will obviously give the proper desired control.

Although certain specific embodiments of the invention have been shown and described, it will be understood that many modifications thereof are possible. This invention, therefore, is not to be restricted except by the language of the appended claims.

While the preferred embodiment of the invention lies in the aforesaid chemical or physical modifications of the polyester resins with herbicidal acids or other herbicides, it must be understood that other secondary modifications are also within the scope of the instant invention. For example, the alkyd resin, prior to herbicidal modifications, may be reacted with fatty acids to produce oil-modified alkyds. Imide, styrenated, epon or urethane modified alkyd resins may also be made by using the requisite chemicals such as amines, styrene, epoxy-containing compounds and isocyanate, to build upon the base polyester molecule. These chemical modifiers may be added in any amount necessary to produce the desired results with the only proviso being that free functional groups exist after the modification in order to make possible the desired further reaction with the herbicidal acids.

Still further useful variants of preferred embodiments may be obtained by chemical modification of the previously modified herbicidal alkyd resin. This of course is only possible where free functional groups are available for such reaction after herbicide addition to the resin.

These modifications may be necessary to impart a better water or alkali resistance, durability, flexibility, hardness, color retention and other attractive physical properties of resins.

In many instances it may be desirable to produce "mixed" resins. These so-called mixed resins are synthesized by the expeditious use of more than one type of acid and/or polyfunctional alcohols. They may be similarly prepared by using the same techniques outlined in the above examples. Such mixed resins are likewise considered to fall within the spirit of the invention. In similar manner, resin synthesis reactions utilizing combinations of herbicidal acids are contemplated as being properly a part of the subject matter of this application.

The invention is hereby claimed as follows:

1. A method of controlling the growth of undesirable vegetation which comprises applying to the situs upon which undesirable vegetation grows a phytocidal amount of a herbicidally active composition comprising a water-insoluble alkyd resin chemically reacted with a phytocidal amount of organic halogenated monobasic herbicidal acid, said composition having an alkyd number of less than 75.

2. The method of claim 1 wherein the alkyd number is from 30 to 50.

3. The method of claim 1 wherein said resin is obtained by the reaction of at least one polycarboxylic acid from the group consisting of phthalic, carbic, succinic, adipic, azelaic, sebacic, maleic, fumaric, citric, aconitic, tricarballylic, halophthalic, endomethylenetetrahydro phthalic, 3,6-endoxohexahydrophthalic and humic acids and at least one polyfunctional alcohol from the group consisting of glycols, trimethylol propane, diethylene glycol, triethylene glycol, pentaerythritol, propylene glycol, dipentaerythritol, sorbitol, glycerol, mannitol, monoalkanol amines, dialkanol amines, and trialkanol amines.

4. The method of controlling the growth of undesirable vegetation which comprises applying to the situs upon which undesirable vegetation grows, a phytocidal amount of a herbicidally active composition comprising at least one herbicide selected from the group consisting of herbicidally active halosubstituted phenols, nitro substituted phenols, organic monobasic halogenated carboxylic acids and ester thereof, s-triazines, phenyl mercuric acetate, potassium cyanate, substituted ureas, arsenic containing compounds, ammonium sulfamate, boron containing compounds, maleic hydrazide, chlorate compounds, alkali metal thiocyanates and isopropyl phenylcarbamate and its halo derivatives, said herbicide being present in a phytocidal amount and being uniformly distributed in a water-insoluble alkyd resin chemically reacted with organic halogenated herbicidal acid, said alkyl polyester resin having an alkyd number of less than 75.

5. The method of claim 4 wherein the alkyd number is from 30 to 50.

6. The method of claim 4 wherein the water-insoluble resin is obtained by the reaction of at least one polycarboxylic acid from the group consisting of phthalic, carbic, succinic, adipic, azelaic, sebacic, maleic, fumaric, citric, aconitic, tricarballylic, isophthalic, terephthalic, halophthalic, endomethylenetetrahydro phthalic, 3,6-endoxohexahydrophthalic and humic acids and at least one polyfunctional alcohol from the group consisting of glycol, trimethylol propane, diethylene glycol, triethylene glycol, pentaerythritol, sorbitol, glycerol, mannitol, monoalkanol amines, dialkanol amines, and trialkanol amines.

References Cited

UNITED STATES PATENTS

| | | | |
|---|---|---|---|
| 1,950,468 | 4/1930 | Zwilgmeyer | 260—76 X |
| 2,394,916 | 2/1946 | Jones | 167—145 |
| 2,951,753 | 9/1960 | Groves | 71—1 |
| 2,979,472 | 5/1961 | Heinrich et al. | 260—76 |
| 3,067,089 | 12/1962 | Winslow | 167—17 |
| 3,074,845 | 1/1963 | Geary. | |
| 3,092,484 | 6/1963 | Salzberg | 71—2.6 |
| 3,117,107 | 1/1964 | Stimpson et al. | 260—75 |
| 3,119,791 | 1/1964 | Messina et al. | 260—75 |
| 3,125,432 | 3/1964 | Todd | 71—2.6 |
| 3,179,608 | 4/1965 | Broadhead | 260—22 |
| 3,212,967 | 10/1965 | McFadden et al. | 167—42 |
| 3,223,513 | 12/1965 | Geary | 167—42 |

FOREIGN PATENTS 597,262   5/1960   Canada.

LEWIS GOTTS, *Primary Examiner.*

JULIAN LEVITT, JAMES O. THOMAS, JR., *Examiners.*

M. M. KASSENOFF, *Assistant Examiner.*

UNITED STATES PATENT OFFICE
CERTIFICATE OF CORRECTION

Patent No. 3,343,941            September 26, 1967

Evan Baltazzi

It is hereby certified that error appears in the above numbered patent requiring correction and that the said Letters Patent should read as corrected below.

Column 9, line 49, for "Example XIII" read -- Example XII --; columns 9 and 10, TABLE I, second column, line 4 thereof, for "88" read -- 8 --.

Signed and sealed this 1st day of April 1969.

(SEAL)
Attest:

Edward M. Fletcher, Jr.            EDWARD J. BRENNER

Attesting Officer            Commissioner of Patents